(12) United States Patent
Kaiser

(10) Patent No.: US 6,736,885 B2
(45) Date of Patent: *May 18, 2004

(54) REFRIGERATOR AIR FILTRATION SYSTEM

(76) Inventor: Dolores Kaiser, 1219 Ashby La., Hendersonville, NC (US) 28791

( * ) Notice: Subject to any disclaimer, the term of this patent is extended or adjusted under 35 U.S.C. 154(b) by 0 days.

This patent is subject to a terminal disclaimer.

(21) Appl. No.: 10/253,396

(22) Filed: Sep. 23, 2002

(65) Prior Publication Data

US 2003/0047079 A1 Mar. 13, 2003

Related U.S. Application Data

(63) Continuation-in-part of application No. 09/934,315, filed on Aug. 21, 2001, now Pat. No. 6,454,841.

(51) Int. Cl.[7] .............................. B01D 46/10; B60H 1/32
(52) U.S. Cl. ......................... 96/224; 96/226; 55/385.3; 55/471; 55/487; 62/440
(58) Field of Search .............................. 55/385.1, 385.3, 55/385.4, 467, 471, 487, 524; 96/224, 226; 422/121, 291; 62/440, 78

(56) References Cited

U.S. PATENT DOCUMENTS

| 2,811,840 | A | | 11/1957 | Thompson |
| 4,047,393 | A | | 9/1977 | Hanson et al. |
| 4,845,958 | A | * | 7/1989 | Senda et al. ............... 62/418 |
| 5,078,971 | A | | 1/1992 | Matuda et al. |
| 5,230,220 | A | | 7/1993 | Kang et al. |
| 5,438,842 | A | * | 8/1995 | Watkins et al. ............ 62/89 |
| 5,451,248 | A | * | 9/1995 | Sadkowski et al. ........ 95/99 |
| 5,453,049 | A | | 9/1995 | Tillman, Jr. et al. |
| 5,501,084 | A | | 3/1996 | Chang et al. |
| 5,568,730 | A | | 10/1996 | Kim et al. |
| 5,772,959 | A | | 6/1998 | Bermas |
| 5,837,207 | A | | 11/1998 | Summers |
| 5,893,939 | A | | 4/1999 | Rakocy et al. |
| 5,997,619 | A | | 12/1999 | Knuth et al. |
| 6,004,365 | A | | 12/1999 | Fiacco |
| 6,092,430 | A | * | 7/2000 | Liston et al. ............ 73/863.81 |
| 6,156,085 | A | | 12/2000 | Chiu et al. |
| 6,156,088 | A | | 12/2000 | Cardarelli |
| 6,286,330 | B1 | | 9/2001 | Kopf |
| 6,454,841 | B1 | * | 9/2002 | Kaiser ..................... 96/224 |
| 6,606,869 | B2 | * | 8/2003 | Takahashi et al. ......... 62/131 |

FOREIGN PATENT DOCUMENTS

| JP | 05157444 | | 6/1993 |
| JP | 05-157444 A | * | 6/1993 |
| JP | 06-288672 A | * | 10/1994 |
| JP | 09243216 | | 9/1997 |
| JP | 10-292979 A | * | 11/1998 |
| JP | 11118326 | | 4/1999 |

* cited by examiner

*Primary Examiner*—Frank M. Lawrence
(74) *Attorney, Agent, or Firm*—McHale & Slavin, P.A.

(57) ABSTRACT

An air filtration system for refrigerated compartments. In one embodiment, the refrigerated compartment of the invention includes a plurality of walls defining the refrigerated compartment, an air inlet passage and an air outlet passage extending through at least one of the walls, a plenum chamber positioned outside of said refrigerated compartment having an air inlet port and an air outlet port wherein the air inlet port and air outlet port are respectively fluidly coupled to the air inlet passage and said air outlet passage, a fan to produce airflow between the air inlet port and the air outlet port, and an air filter assembly disposed within the plenum. The air filtration system of the invention can be utilized in a refrigerated commercial transport vehicle.

9 Claims, 4 Drawing Sheets

REFRIGERATOR AIR FILTRATION SYSTEM

CROSS REFERENCE TO RELATED APPLICATION

This is a continuation-in-part of application Ser. No. 09/934,315 filed Aug. 21, 2001 entitled "REFRIGERATOR AIR FILTRATION SYSTEM," now U.S. Pat. No. 6,454,841, which is herein incorporated in its entirety by reference.

FIELD OF THE INVENTION

The present invention relates to an apparatus for refrigerator air filtration; more particularly to an air purifying system particularly adapted to a refrigerator; and most particularly to an air filtration system constructed and arranged for cleaning the air within a refrigerator to eliminate harmful allergens and other particulates potentially affecting food storage.

BACKGROUND OF THE INVENTION

Several types of apparatus for filtering and cleaning air within a living space are known. As well, the use of microfilters for contaminant removal from either liquid or gaseous streams is well-known in the art. Removal of common allergens tend to be targeted specifically within the indoor air of the home. Little, if any, attention is typically directed toward modifying the air quality within a refrigerator. Various organisms such as mold spores are commonly suspended in the air along with bacteria, viruses, and other small particles unable to be trapped in average filters. If left untreated, the air within the confines of a refrigerator will proliferate these organisms, accelerate food spoilage, and denigrate the taste and aroma of certain foods. Thus, if an effective air filtering device, specially suited for filtering refrigerator air, could be provided for removing potentially harmful components from the air within a refrigerator, a long-felt need would be realized.

DESCRIPTION OF THE PRIOR ART

U.S. Pat. No. 5,997,619 issued to Knuth et al discloses a self-contained air movement system having a housing unit. Air is circulated through the housing unit by a fan. The air enters an inlet, is circulated through a germicidal unit, a filter unit, and out an outlet. The germicidal unit is an ultraviolet irradiation means. Claim 12 defines the filter as a HEPA filter. Claim 7 claims a carbon mesh discharge filter which is added in addition to the HEPA filter to absorb residual odors from the unit. The fan is run by a motor with the source of electricity being an electrical outlet. The portable unit is designed for small rooms. The patent fails to contemplate treating air within a refrigerator.

U.S. Pat. No. 5,837,207 issued to Summers discloses a germicidal air purifier that is portable having a cabinet with an area for admitting air and an area for exhausting filtered air, a planar filter medium, and a means for moving air to be filtered. Claim 23 claims a fan as the means for moving the air. Claim 8 claims a pleated paper medium for filtering the air. Ultraviolet radiation is essential for function. The patent fails to contemplate treating air within a refrigerator.

U.S. Pat. No. 5,453,049 issued to Tillman, Jr., et al teaches a room air filter comprising a triangular housing unit with a high efficiency particulate air (HEPA) filter and a fan assembly. The specification discloses the use of HEPA filters and ULPA filters. The fan assembly is disclosed as a circulating fan including centrifugal, axial, or plenum type. The unit may be adapted to be mounted to a wall corner. The patent fails to contemplate treating air within a refrigerator.

U.S. Pat. Nos. 6,156,088; 6,156,085; 6,004,365; and 5,893,939 disclose air filters with variations on the basic idea of a housing unit with an air inlet, air outlet, fan and filter. In each patent, the air is circulated through the filter, housed within the unit, by the fan. U.S. Pat. No. 6,156,085 issued to Chiu et al specifically claims an air cleaner that is portable. U.S. Pat. No. 6,156,088 issued to Cardarelli describes an ashtray in the shape of a flower arrangement with features to pull in smoke-filled air. U.S. Pat. No. 6,004,365 issued to Fiacco is specially for use in conjunction with a room ceiling fan. U.S. Pat. No. 5,893,939 issued to Rakocy et al includes a compressible, resilient gasket adjoining a substantially vertical wall of the base assembly. None of these patents contemplate treating air within a refrigerator.

SUMMARY OF THE INVENTION

The present invention is directed toward filtering air within an appliance such as a refrigerator, particularly through the use of a microfilter having a pore size sufficient for removing bacteria and other minute particulates which may be down to 1 or less, for a residential or commercial refrigerator. The microfilter can function in conjunction with the refrigerator's integral fan to rid the refrigerator air of airborne particulates illustrated by, but not limited to, mold spores, bacteria, and viruses. In an alternative embodiment, a means effective to produce airflow between the interior air inlet and an interior air outlet of a plenum chamber, such as a fan, is provided in conjunction with the filter. A means for driving the manner in which airflow is produced is also provided. Such means may include an adapter for deriving electricity, e.g. via the electric socket for the ice-maker or light bulb found within most refrigerators, power by battery, or other means by which the cooling device is powered. In a further embodiment, a radiant disinfection means, such as an ultraviolet (UV) lamp, is incorporated within the to disinfect the air drawn through the filtration system.

In one embodiment, the filtration system is positioned outside of the refrigerated compartment. The refrigerated compartment of the invention includes a plurality of walls defining the refrigerated compartment, an air inlet passage and an air outlet passage extending through at least one of the walls, a plenum chamber positioned outside of said refrigerated compartment having an air inlet port and an air outlet port wherein the air inlet port and air outlet port are respectively fluidly coupled to the air inlet passage and said air outlet passage, a means effective to produce airflow between the air inlet port and the air outlet port, and an air filter assembly disposed within the plenum. The means effective to produce airflow is a preferably a fan, which can be disposed within the plenum.

The air filter assembly can have an air permeable membrane having bactericidal properties. A plurality of air filters can be used in a stacked configuration, which as be serially arranged with respect to decreasing pore size. A radiant disinfection means, such as an ultraviolet lamp, can be placed in the plenum chamber to disinfect air flowing through the plenum chamber.

In another embodiment, a refrigerated compartment having an air filtration system comprises a plurality of walls defining the refrigerated compartment wherein at least one of said walls has a cavity therein forming a plenum chamber having a air filter assembly disposed therein. The plenum chamber has at least one air inlet port and an air outlet port such that the plenum chamber is in fluid communication with said interior airspace. A means effective to produce airflow between the air inlet port and the air outlet port is provided, such as a fan.

Accordingly, it is an objective of the instant invention to provide a microfilter adapted to clean the air within a refrigerator.

It is a further objective of the instant invention to provide an apparatus to further aid in disinfecting the air within a refrigerator.

It is yet another objective of the instant invention to provide a safe, simple, and reliable manner to rid refrigerator air of any hazardous microorganisms contained within the appliance.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the resent invention and illustrate various objects and features thereof.

DESCRIPTION OF THE INVENTION

The air filtration system of the present invention has the capability to clean the air within a refrigerator, accomplished particularly through the use of a microfilter. A microfilter has micropores permeable to air and oxygen and provides the ability to filter out fine particles such as bacteria and other microorganisms and airborne pollutants. Microfilters can be constructed of a variety of materials which can be of a woven or non-woven material. An example of a common filter material is polypropylene. Microfilter foils have also been employed for cross flow filtration needs. HEPA filters are also quite effective in particulate removal such as mold spores and pollen with a filtration rating approximately to 0.3.

A potential problem faced within the variably humid environment of a refrigerator is that a buildup of moisture can restrict porosity of a filter, particularly the fine pores of a microfilter. Use of a pre-filter or water repellent pad may therefore be indicated. Depending on the choice of materials, the filters will either need to be periodically replaced or properly cleaned, such as with a mild soap and water or in a dishwasher, and dried for reuse.

As time passes, an air filter may hold bacteria potentially capable of growing on the surface of the filter material. An additional contemplated embodiment of the present invention includes a filter media having properties which may be molded within a polymer.

The air filter or filters remain in place with the aid of various support means which may be provided as part of the air filter assembly of the plenum chamber. In a further embodiment, best illustrated in FIGS. 3, 3A, or 3B, the support means for the filter or filters may not be attached to a plenum chamber. By way of example, a fitted, or insertable, frame is employed in which the filters may be inserted to easily slide in and out as desired. One or more brackets can also be used for support by coupling the bracket(s) to an interior area of a refrigerator in combination with a frame. Additionally, a type of adhesive on the outside portion of the filter or frame may be utilized. Several filters may be serially arranged with respect to pore size in order to satisfy particular uses and/or needs within a refrigerator. By way of example, a series of filters arranged with respect to decreasing pore size may be useful to postpone the life of a microfilter by trapping a larger particulate within a first filter, whereas a smaller particulate may pass through one or more filters before becoming trapped within a microfilter having a pore size sufficient to capture that smaller particulate.

Figure 1:
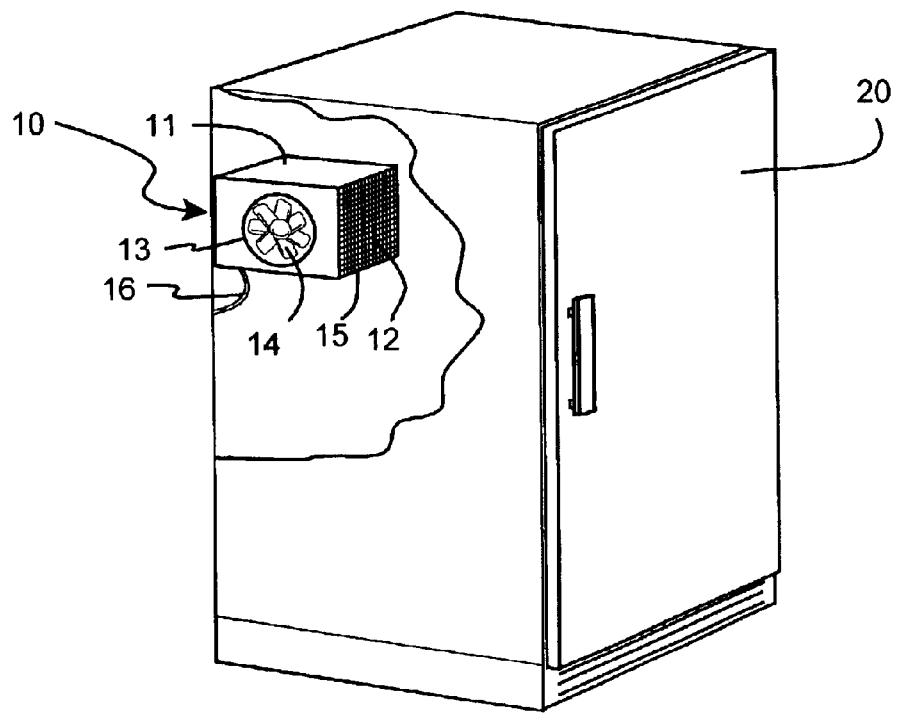
FIG. 1 is a side view of a filtration apparatus positioned within the interior of a refrigerator.
Figure 2:
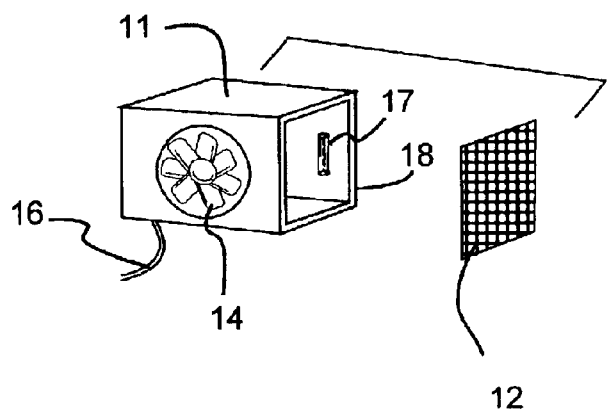
FIG. 2 is a exploded view showing the construction of the air filter apparatus.

Referring to the drawings in more detail, FIG. 1 demonstrates an air filtration means within a refrigerator 20 such as for commercial or residential use. The detailed construction of the air filtration means is illustrated in the exploded view shown in FIG. 2. Located within the vented housing, essentially a plenum chamber 11, is the means effective to produce airflow, illustrated by, but not limited to, a fan 14, and an air filter assembly comprising a filter or plurality of filters 12. Although FIG. 1 shows the plenum chamber within the interior airspace of a refrigerator 20, it is for illustrative purposes and does not limit the contemplated invention. The plenum chamber 11 provides integral attachment means for the components such as for the support of an air filter assembly and attachment to a wall 10 or walls of a refrigerator 20. The means for support for the filter or filters may be an insertable frame, adhesive, or the like. By way of example, a microfilter with a pore size up to about 1, which can be utilized an any of the embodiments of the instant invention, is positioned within an insertable frame as part of an air filter assembly supported within a plenum chamber that is attached or in communication with the interior airspace, such as the interior walls, of a refrigerator.

As illustrated, the plenum chamber 11 is in fluid communication with an interior airspace of a refrigerator, and may comprise an elongated housing having an axis corresponding to the path of air flow with the air flow following the axis. The air movement flows into the air-permeable wall, or interior air inlet 15 opening, of the chamber, downstream through an air filter assembly containing the filter or filters 12, past the fan (air movement means) 14, and back out through a second air-permeable wall, or interior air outlet 13 opening, of the chamber. The interior air inlet 15 opening and interior air outlet 13 opening may or may not be axially aligned. In a non-limiting embodiment, the apparatus is positioned wholly within the interior airspace of the refrigerator 20. Alternatively, the existing air handling means of the appliance can be utilized, wherein the filter is positioned over a vent for the fan. The air is pulled through the filter, past the fan, and along the factory installed means for circulating air. On the contrary, the air travels through the air handling means and past the filter as it re-enters the refrigerator interior or interior airspace, such option being determined by the user or dictated by the availability of a vent communicating with the interior of the refrigerator. In an alternative embodiment, the plenum chamber may be integrally attached to or molded within a refrigerator design as it is manufactured. In a further embodiment, a radiant disinfection means 17, best illustrated in FIG. 2, such as an ultraviolet lamp, which produces ozone naturally through its UV light rays, may be positioned upstream of the air filter or filters to disinfect the air as it passes through the chamber. A means for energizing the lamp would also be included.

Figure 3:
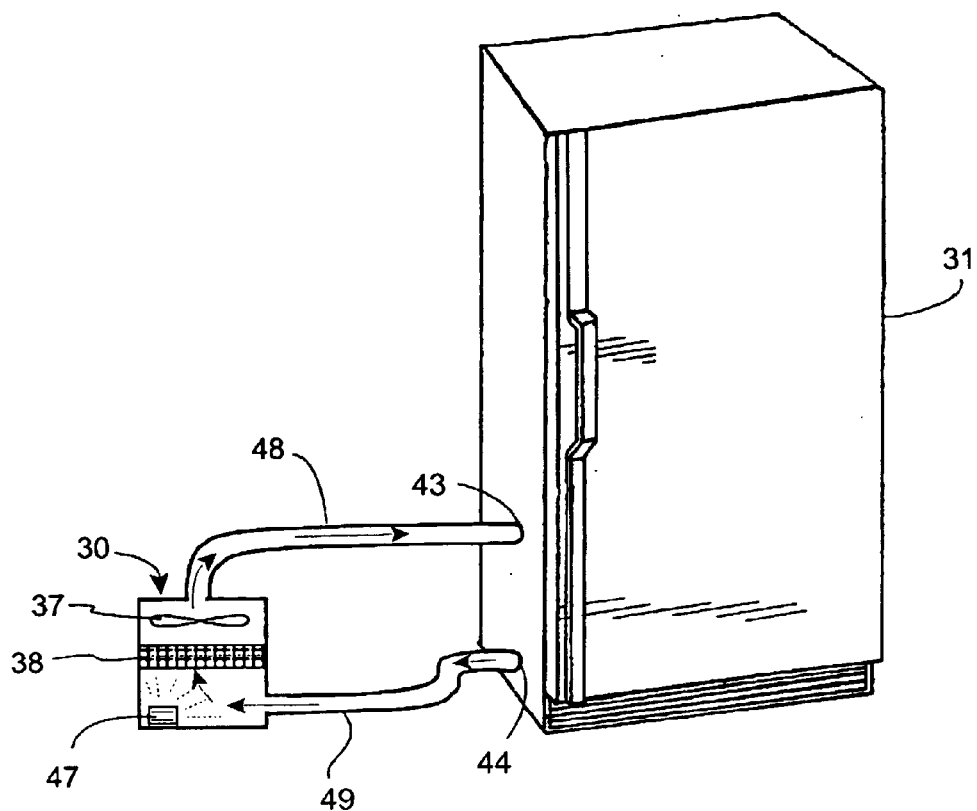
FIG. 3 illustrates an alternative embodiment in which the air filtration unit is located outside of the refrigerated compartment.

FIG. 3 illustrates an alternative embodiment of a refrigerated compartment having an air filtration system in the form of a plenum chamber 30 positioned outside of the refrigerated compartment 31. The illustrated configuration of the refrigerated compartment 31 shown in FIG. 3 is only representative in nature, and the invention is not limited in this regard. The filtration system of the invention is suitable for use in any type of commercial or residential refrigeration unit. For example, the refrigerated compartment 31 can also be a retail display case, a commercial transport vehicle, an industrial installation, etc.

Figure 4:
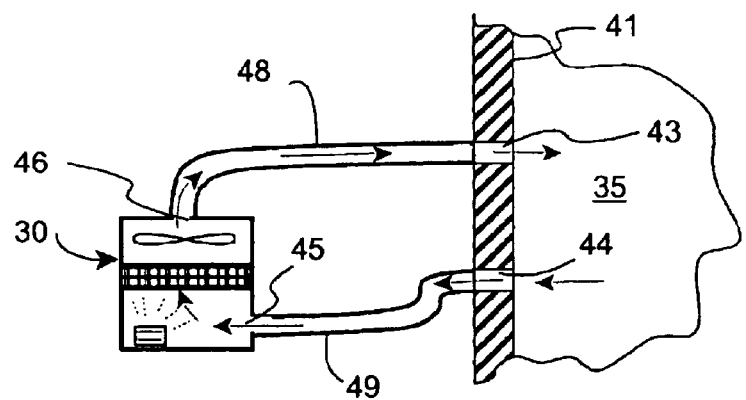
FIG. 4 is a partial cross-sectional view of the embodiment shown in FIG. 3.

As can be seen in the cross-sectional view shown in FIG. 4, an exterior wall 41 of the refrigerated compartment 31 includes at least two apertures extending therethrough which form an air inlet passage 43 and an air outlet passage 44. The plenum chamber 30 includes an air inlet port 45 and an air outlet port 46 which are coupled to the air inlet passage 43 and air outlet passage 44 such that the interior air space 33 of the plenum chamber 33 is in fluid communication with the interior airspace 35 of the refrigerated compartment 31. In the illustrated embodiment, the air is conveyed between the plenum chamber 30 and the refrigerated compartment via conduits 48 and 49. The plenum chamber 30 can also be positioned so as to be juxtaposed with the exterior wall 41 so that the air inlet/outlet ports 45/46 are flushly aligned with air inlet/outlet passages 43/44. A means is provided to produce airflow between the air inlet port 45 and the air outlet port 46, such as the fan 37. In the illustrated embodiment, the fan 37 is positioned inside the plenum chamber 30, however the fan 37 could also be located outside the plenum chamber 30 in any position which be effective to produce the desired air flow. As described in the previous embodiment, the plenum chamber 30 includes a filtration assembly 38 which can contain one or more filters. An ultraviolet lamp 47 can also be enclosed within the plenum chamber 30 to disinfect the air as it passes through the chamber.

Figure 5:
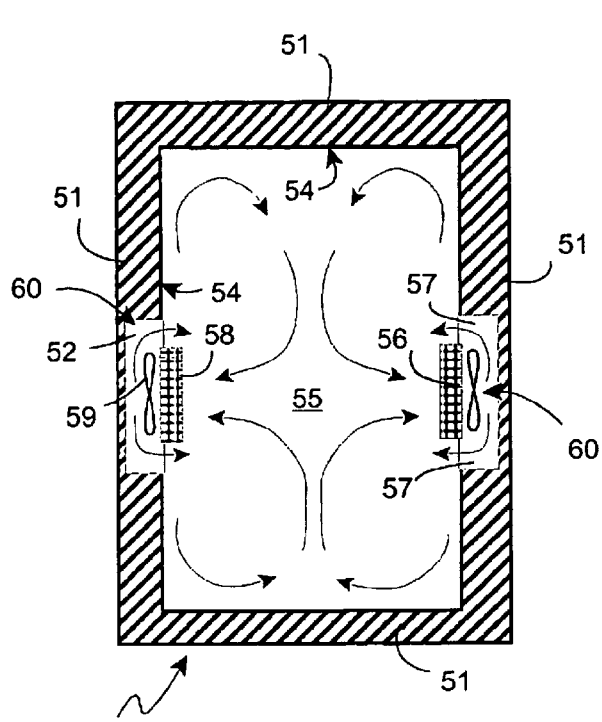
FIG. 5 is a cross-sectional view of an alternative embodiment of the invention in which air filtration assemblies are installed in cavities in the opposing side walls of the refrigerated compartment.
Figure 6:
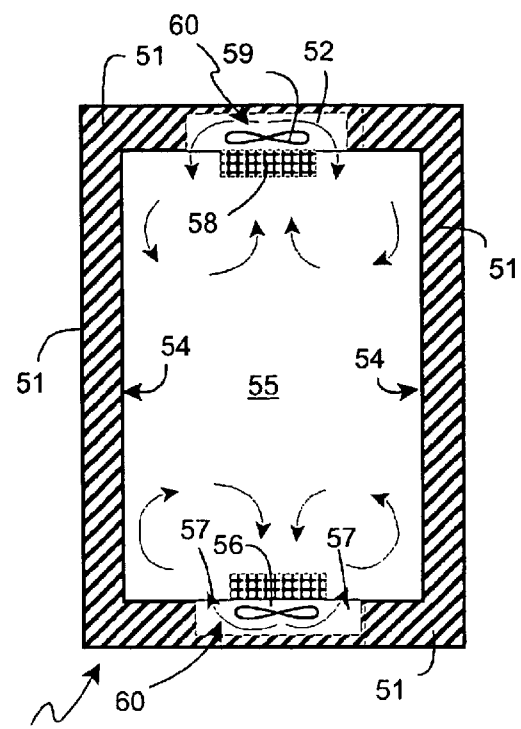
FIG. 6 is a cross-sectional view of an alternative embodiment of the invention in which air filtration assemblies are installed in top and bottoms walls of the refrigerated compartment.
Figure 7:
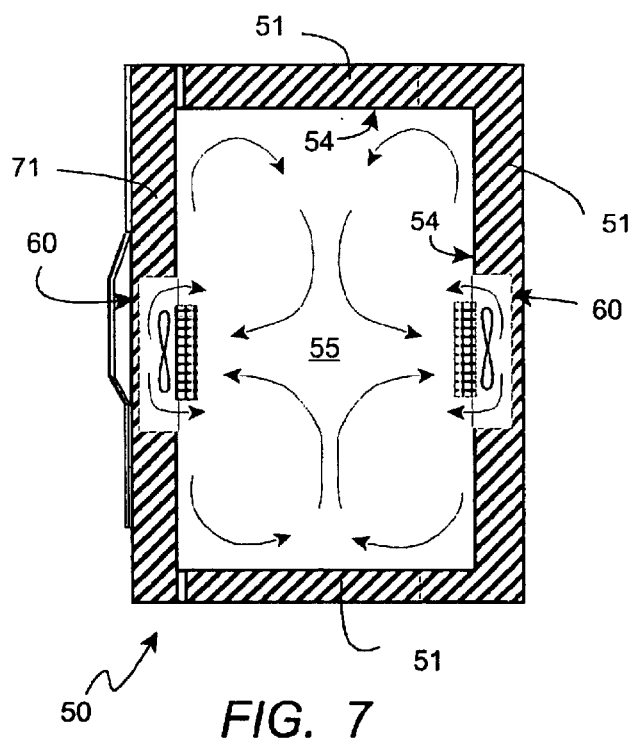
FIG. 7 is a cross-sectional view of an alternative embodiment of the invention in which air filtration assemblies are installed in cavities in the door and back wall of the refrigerated compartment.

Yet another embodiment of the invention is illustrated in cross-section in FIGS. 5–7. Referring now to FIG. 5, a refrigerated compartment 50 is formed by a plurality of insulated walls 51. At least one of the walls 51 includes an interior cavity 52 which houses an air filtration assembly 60 and functions as a plenum chamber. The interior surface 54 of the refrigerated compartment wall includes a plurality of apertures which permit fluid access between the cavity 52 and the interior airspace 55 of the refrigerated compartment 50. In the illustrated embodiment, the apertures are configured to provide air inlet passages 56 and air outlet passages 57. A means is provided to effect airflow from the air inlet passages 56 through the air outlet passages 57, and a filtration assembly 58 is positioned in the air stream. In the preferred embodiment, a fan 59 is positioned within the cavity 52.

The refrigerated compartment 50 can include a plurality of air filtration assemblies 60 in any desired configuration. In the embodiment shown in FIG. 5, a pair of air filtration assemblies 60 are located within the opposing side walls of the reformation compartment 50. FIG. 6 illustrates an arrangement wherein the top and bottom walls of the refrigerated compartment 50 each include an air filtration assembly 60. FIG. 7 illustrates an embodiment in which at least one of the air filtration assemblies are located in the door 71 of the refrigerated compartment 50.

An additional contemplated embodiment of the present invention includes utilizing an air permeable membrane, or filter with media, providing bactericidal properties molded within the polymer. Any of the above embodiments may employ this type of filter.

This type of air filtration apparatus could be applied within a variety of storage containers where the freshness of the contents, food or otherwise, are of a concern.

Figure 8:
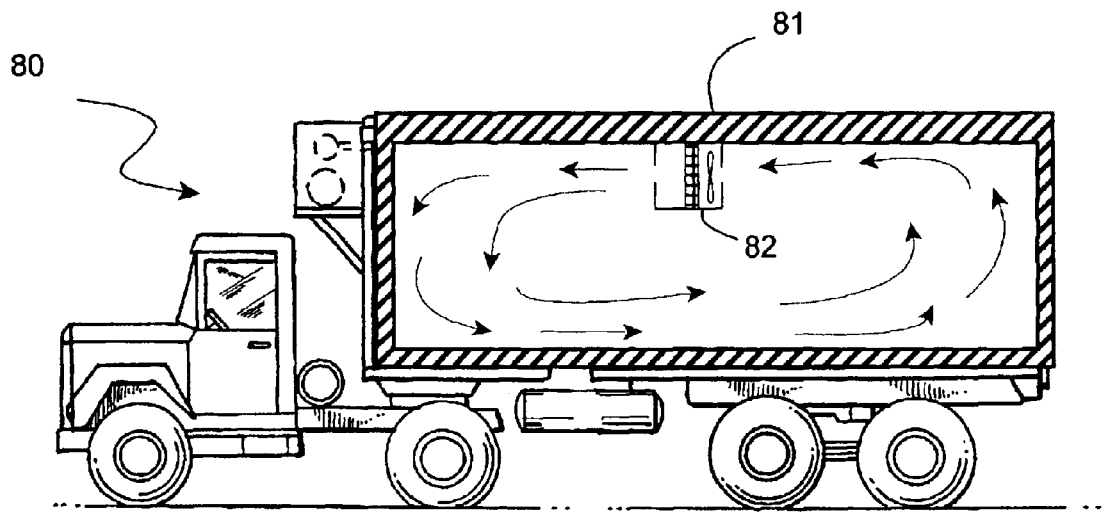
FIG. 8 illustrates another embodiment of the invention as installed in a semi-truck having a refrigerated compartment.
Figure 9:
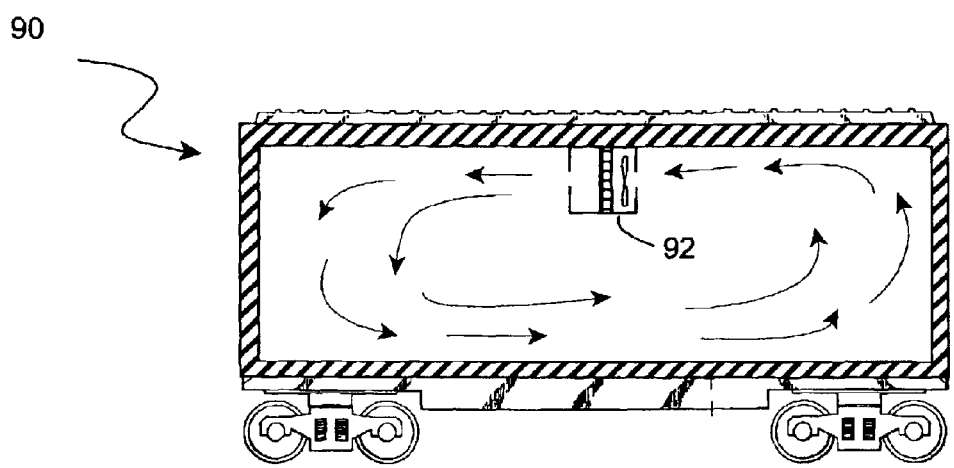
FIG. 9 illustrates the embodiment shown in FIG. 8 as installed in a refrigerated rail car.

As stated previously, the filtration system of the present invention can be utilized in any type of refrigerated compartment. FIG. 8 illustrates a semi-truck 80 having a refrigerated compartment 81. In the illustrated embodiment, at least one air filtration assembly 82 constructed in accordance with the principles of the invention is installed within the interior airspace of the refrigerated compartment 81. A fan located within the air filtration assembly 82 moves air through the air filtration assembly 82 and circulates the air within the interior airspace. FIG. 9 illustrates a similar arrangement in which a air filtration assembly 92 is installed in the interior of a refrigerated rail car 90.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An air filtration kit for a refrigerated compartment in a commercial transport vehicle, comprising:
   a plenum chamber positioned within an interior airspace of the refrigerated compartment, said plenum chamber having an air inlet port and an air outlet port wherein said plenum chamber is in fluid communication with the interior airspace;
   at least one bracket mountable to at least one interior wall of the refrigerated compartment for attachment to said plenum chamber;
   a fan disposed inside said plenum chamber effective to produce airflow between said air inlet port and said air outlet port;
   an air filter assembly disposed within said plenum chamber adapted to support at least one filter element therein wherein said air filter assembly comprises an air permeable membrane having a pore size unto about $1\mu$, said air filter assembly including at least one air filter positioned upstream of said fan;
   mounting means for positioning said air filter assembly in fluid communication with an interior airspace of the refrigerated compartment, and
   a means for supporting said air filter in said upstream position.

2. The air filtration kit as in claim 1, wherein said air filter assembly further comprises an air permeable membrane having bactericidal properties.

3. The air filtration kit as in claim 1, wherein said air filter assembly comprises a plurality of air filters serially arranged with respect to decreasing pore size.

4. The air filtration kit as in claim 1, said plenum chamber further including radiant disinfection means positioned upstream of said filter whereby air flowing through said plenum chamber is disinfected thereby.

5. The air filtration kit as in claim 4, wherein said radiant disinfection means is an ultraviolet lamp including a means for energizing said ultraviolet lamp, whereby air flowing through said plenum chamber is disinfected by ozone produced by said ultraviolet lamp.

6. The air filtration kit as in claim 1, wherein the mounting means is a filter insertable frame.

7. The air filtration kit as in claim 1, wherein said frame includes an adhesive.

8. The air filtration kit as in claim 1, wherein said mounting means is at least one bracket coupled to the interior air space.

9. The air filtration kit as in claim 1, wherein said air filter assembly comprises a microfilter.

* * * * *